United States Patent Office 3,247,168
Patented Apr. 19, 1966

3,247,168
POLYOXAMIDES
Gelu Stoeff Stamatoff and Norman K. J. Symons, Newark, Del., assignors to E. I. du Pont de Nemours and Company, Wilmington, Del., a corporation of Delaware
No Drawing. Filed Nov. 13, 1962, Ser. No. 237,306
5 Claims. (Cl. 260—78)

This invention relates to novel polyoxamide resins and to processes for preparing the same. This application is a continuation-in-part of abandoned application S.N. 689,269, filed October 10, 1957, which is a continuation-in-part of abandoned application S.N. 293,667, filed June 14, 1952.

Numerous efforts have been made in the past to prepare interesting and useful products by reaction between diamines and oxalic acid or its esters. Many years ago, salts were made from oxalic acid and diamines, including octamethylene diamine, but these products possessed no practical utility. Carothers and co-workers were the first to prepare polyoxamides having fiber-forming properties (U.S. Patents 2,071,251, 2,130,948, 2,172,374, 2,130,523, 2,158,064, 2,190,770, 2,071,250, 2,130,947, etc.). I. G. Farbenindustrie also investigated polyoxamides (French Patents 881,333, 882,841, 894,172, 894,171; Swedish Patent 114,623; German Patent 645,882). Moreover, a series of patents on polyoxamides has issued to British Celanese Ltd. and Celanese Corporation of America (U.S. Patents 2,483,513, 2,483,514, 2,558,031; British Patents 610,311, 616,443, 636,348). However, despite these numerous investigations into the properties of an extremely wide variety of polyoxamides in various parts of the world, no commercialization of polyoxamides has been undertaken heretofore; indeed, certain other polyamides such as those derived from adipic acid, sebacic acid and/or caprolactam, have taken precedence over polyoxamides, so far as commercialization is concerned. This has occurred in spite of the fact that oxalic acid is considered to be potentially the cheapest of the dicarboxylic acids, and in spite of the fact that the polyadipamides, polysebacamides, etc., have the undesirable property of discoloring upon prolonged exposure to light, unless inhibitors are present.

Introduction of certain substituents which provided functional groups along the polymer chain gave rather interesting results, making it possible to cross-link the polymers, but such products have not yet proved to be valuable commercially. For example, a linear polyoxamide containing two primary amino and one secondary amino group in each diamine unit gave such a fiber-forming polyoxamide (cf. U.S. Patents 2,483,513, 2,483,514). Generally speaking, polyamides of improved spinnability have not been obtained merely by introducing substituents along the polymer chain, e.g. either on the nitrogen atoms of the polyamide groupings (U.S. 2,130,523), or by introducing a methyl group at or near the middle of the chain (Fr. 894,172; U.S. 2,172,374, and 2,190,770). Diamines having side substitution, exemplified by 2,5-diaminohexane have been mentioned as polyoxamide intermediates, but in general the polyoxamides thus made have been too high-melting to be effective as fiber-forming polymers, since the melting temperature was not low enough to permit melt extrusion on a large scale without excessive decomposition in the absence of plasticizers.

In French Patent 882,241 it was disclosed that good superpolyamides could be produced from oxalic esters and diamines having the carbon chain broken by tertiary nitrogen atoms; also that other diamines, including 2-methyl-hexamethylene diamine could be used in such polymers as comonomer ingredients. The method for preparing the polyoxamides in the process of French patent was to add together stoichiometric proportions of the reactants, carrying out the initial reaction at low temperature in the presence of a diluent such as an alcohol, tetrahydrofurane, methylene dichloride, benzene, cyclohexane, etc. followed by further heating at about 200° C. The resulting products became insoluble upon treatment with a reactive dihalide.

Textile fibers composed of synthetic linear polyamides, particularly poly(hexamethylene adipamide), have achieved considerable commercial success since their discovery. These fibers are characterized by high tenacity and abrasion resistance, but their dimensional stability decreases to some extent upon prolonged use under conditions of high temperatures and humidity. Also, fabrics produced from the polyamide fibers of the prior art do not recover as well as desired after repeated washings. Polyester fibers, particularly those composed of poly(ethylene terephthalate), have been produced which overcome this latter difficulty. It would be highly desirable if there could be provided a polyamide composition from which could be prepared textile fibers of good wash-wear characteristics, while retaining the excellent physical properties of conventional polyamide fibers. It would be even more desirable if there could be provided such fibers which were further characterized by an increased dimensional stability, even after prolonged use under conditions of high temperature and humidity, and many other better physical characteristics.

In summary, the prior art taught that polyoxamides could be made from a very broad range of diamines, but failed to point out the particular homologues disclosed herein which have surprising utility, differing from the class as a whole.

Despite extensive work on polyoxamides, hereinabove summarized, there has appeared in the literature no description of a simple alkylene polyoxamide having fiber-forming properties similar to or superior to those of the polyadipamides and having certain other desirable properties, especially resistance to deterioration by light. An object of this invention is to provide simple polyoxamides which compare favorably wtih the best polyadipamides from the standpoint of spinnability and fiber strength while at the same time possessing superior resistance to discoloration or deterioration upon prolonged exposure to light, without the use of inhibitors.

In view of the extensive investigations hereinabove summarized, it was indeed surprising to discover that high quality spinnable polyoxamides, having inherent viscosities above 0.7, capable of forming melts which are thermally stable over a sufficiently wide range of temperature for practical melt extrusion operations, and having resistance to deterioration by light superior to that of the polyadipamides, are obtainable by condensation of oxalic esters with 1,8-diamino-n-octane or from monomethyl or dimethyl polymethylene diamines, in which the said methyl groups are in the 1, 2, or 3 positions, and the chain separating the —NH$_2$ groups is from 5 to 12 carbon atoms in length. More particularly, the outstanding diamine components, from the standpoint of unexpected useful properties, are 1,8-diamino-n-octane 2-methylhexamethylene diamine, 3-methylhexamethylene diamine, and NH$_2$CH(CH$_3$)(CH$_2$)$_8$(CH$_3$)CHNH$_2$.

Low melting temperature (below 225° C.) is generally very undesirable in fiber-forming polyamides (where resistance to softening during ironing, and loss of strength in tire cord due to heat generated in use are important). In the table which follows a polyamide which has too narrow a range of temperature within which the melt is stable is listed as failing in "High Temperature Range of Workability," by which is meant the temperature differential between softening and incipient decomposition, in the absence of plasticizer or modifier, the incipient decomposition temperature being 290° C.

These high quality spinnable polyoxamides having inherent viscosities greater than 0.7 are entirely novel and differ from prior art polyoxamides markedly in physical properties.

The polyoxamides listed in Table 1 were prepared by reaction between the respective diamines and pure dimethyl, diethyl, dibutyl, or other lower dialkyl, oxalate in a volatile diluent such as ethanol, followed by stripping the solvent and heating the residue at a pressure below 1 mm. at the indicated temperature. The reaction is an exothermic one and heat removal is facilitated through the use of a solvent.

Upon completion of the subsequent polymerization, the polymer may be cast or extruded into films or spun into filaments. The relatively low melt viscosity for such a highly polar and associated polymer permits melt spinning in a conventional manner, i.e., as practiced with polyhexamethylene adipamide over the comparable ranges of inherent viscosity.

By the term "oriented shaped article" as used herein is meant solid structures such as monofilament and multifilament yarn, spun yarn, fabrics, film, and the like.

The resistance of 2-methylhexamethylene polyoxamide and 3-methylhexamethylene polyoxamide to deterioration by strong ultra-violet radiation is shown in Table 2.

TABLE 1
*Properties of polyoxamides*

| Diamine | Final Polymerization Conditions | | | Crystalline M.P., °C. | Polymer Color | Inherent Viscosity | Spinnability | Drawability | High Temp. Range of Workability at °C. |
|---|---|---|---|---|---|---|---|---|---|
| | Time (hrs.) | Temp. (°C.) | Stick Temperature, °C. | | | | | | |
| Tetramethylene | | [2] 350 | 375 | | | | | | |
| Pentamethylene | 2 | 325 | 285–90 | | Fawn | 0.55 | Manually only | 3× at 220 | 5 |
| Heptamethylene | 1 | 288 | 260–65 | | Pale yellow | 0.61 | Yes | 4× at 165 | 30 |
| Octamethylene | 2 | 315 | 275–78 | | do | 0.75 | Yes | 5× at 200 | 15 |
| Decamethylene (U.S. 2,558,031) [1] | | | | 290 | Cream [1] | [1] 0.72 | Yes [1] | 5× at 150 [1] | 0 |
| 3-methyl hexamethylene | 2 | 256 | 235–38 | 244 | White | 1.2 | Good | 2× cold | 50 |
| 2,5-dimethyl hexamethylene | 2½ | 240 | 220–25 | | do | 0.45 | do | Incipient cold | Failed |
| 3-neopentyl heptamethylene | 2 | 175 | 125–35 | | Translucent, pale yellow. | 0.47 | do | 1½× cold | do. |
| 3-methyl heptamethylene | 2 | 240 | 195–205 | | Cream | 1.0 | Very good | 4× cold | do. |
| 5-methyl nonamethylene | 2 | 197 | 170–75 | | Pale yellow | 0.64 | Good | 3× cold | do. |
| 2,5,8-trimethyl nonamethylene | 2 | 140 | 105–10 | | Translucent, pale yellow. | 0.37 | do | 2× cold | do. |
| 2,11-diaminododecane | 2 | 241–256 | 228 | | Colorless | 1.17 | Very good | 4× cold | 70 |
| 2-methylhexamethylene | 1 | 273 | 250 | 250 | do | 1.1 | do | 4× cold | 40 |
| 2,5-diaminohexane | 2 | 270 | | 322 | | 0.25 | | | 0 |

[1] A lower-melting decamethylene polyoxamide having a melting point of ca. 250–255° C. was obtained by the method disclosed herein, using a final polymerization temperature of 288° C. (one hour final heating time), but this was not described in the prior art. The physical properties given are for the material melting at 250–255°. Similarly, the other polyoxamides listed were, in several instances, superior to prior art products made from the same components.
[2] Did not melt.

Oriented shaped articles having the desired characteristics may be prepared in accordance with the present invention from the branched polyoxamides above mentioned, or from a synthetic, linear polymeric composition containing at least about 90% by weight combined poly-(octamethylene oxamide) having an inherent viscosity in sulfuric acid of at least about 0.7. These novel articles contain at least about 90% by weight of a combined polyamide composed of recurring structural units of the formula:

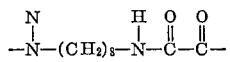

Copolymers of this polyamide containing up to about 10% by weight of a copolymerizable monomer retain the desired physical characteristics provided in fibers of this novel composition. Furthermore, when added, even in minor amounts, to a synthetic linear polyamide substrate, the physical characteristics of the substrate are greatly enhanced.

The novel polyamide composition may be prepared by the reaction of 1,8-diamino-n-octane with an oxalic acid ester in the presence of a suitable polyamidation catalyst, following which the resulting prepolymer is polymerized in the solid phase to the desired degree of polymerization. In a preferred process, the diamine is reacted with a stoichiometeric equivalent of di-n-butyl oxalate in the presence of arsenous oxide, the reaction being carried out in dry toluene.

Part of the 1.8-diamino-n-octane can be substituted by hexamethylene diamine, or other diaminoalkane, but the amount of other such diamine should not be substantial, i.e. enough to have an effect on the polymer properties; thus, the amount may be up to 10% by weight.

TABLE 2
*Comparison of light stability of polyoxamides and polyadipamides*

| Fiber | Hrs. Fadeometer | Percent of Original Tenacity Remaining |
|---|---|---|
| Hexamethylene polyadipamide | 0 | 100 |
| | 100 | 64 |
| | 700 | 12 |
| | 1,000 | 10 |
| 2-methylhexamethylene polyoxamide | 0 | 100 |
| | 500 | 91 |
| | 1,000 | 41 |
| 3-methylhexamethylene polyoxamide | 0 | 100 |
| | 100 | 100 |

An outstanding polyoxamide prepared by the method described above is the polyoxamide derived from 2,11-diaminododecane of the formula $$H_2NCH(CH_3)(CH_2)_8CH(CH_3)NH_2$$

This diamine is obtainable by the method disclosed in British Patent 737,423. This polyoxamide has a very low water absorption capacity (0.96%) and a melting point (stick temperature) of 228° C. (inherent viscosity, 1.16). It has good freedom from color, and is color-stable, and does not degrade upon prolonged exposure to light. A specimen of this polyoxamide had a stiffness of 324,000 p.s.i. at 23° C., 293,000 at 53° C., 88,500 at 100° C. and 83,200 at 106° C.; these figures are comparative, and constitute a measure of deflection of a bar suspended at both ends in a standardized testing machine and loaded at the center.

A most important consideration in the preparation of high quality polyoxamides is the quality of the oxalic ester employed as a reactant. Oxalic esters of ordinary purity cannot be used effectively. It is essential to employ oxalic esters which have been freed of acidic impurities. This can be done, for example, by treatment with lime (2 to 5% of dry $Ca(OH)_2$) followed by filtration, and distillation of the filtrate at reduced pressure. In this manner ester which when mixed with water does not turn methyl orange indicator from orange to red is obtainable; ester of this degree of purity is required.

A general procedure for converting the diamine to polyoxamide is to use an inert diluent (e.g. a weight of toluene equal to the weight of diamine) containing 0.1% phosphorus acid, and to add the purified oxalate ester to the diamine, phosphorous acid and diluent with vigorous stirring. The prepolymer forms within a few minutes and the entire mixture solidifies into a finely divided white solid. The solid is transferred to another vessel and heated in a slow stream of nitrogen, keeping the temperature slightly above the melting point, for one hour. The procedure can be varied, of course, in cases where the reaction between the ester and diamide is relatively slow. In such instances a diluent need not be used. This is true, for example, when the diamine is 2,11-diaminododecane.

The viscosities reported herein were determined by dissolving 0.5 gram of polymer in m-cresol and diluting with m-cresol to 100 cc., followed by determining the rate of flow of the solution through a viscosimeter. The viscosity at 25° C. ($N_I$), equals $$\ln \frac{\frac{\text{flow for solution}}{\text{flow for m-cresol}}}{0.5}$$

The fatigue resistance of the polyoxamides of this invention under moist conditions is one of the most outstanding advantages of these polyoxamides, over previously known nylons, as shown by the following table. The fatigue endurance limit, which is reported in the table, is determined in a Sonntag fatigue testing machine, in which a specimen is subjected to alternating compression and stretching with the same load along the same axis; and maximum stress which can be tolerated without breakage after ten million cycles is the "fatigue endurance limit."

TABLE 3

*Fatigue endurance of certain polyoxamides—Effect of moisture*

| Identity of Nylon | Percent H₂O Wt. | Fatigue Endurance Limit, p.s.i. |
|---|---|---|
| Polyhexamethylene polyadipamide (66) | 0 | 4,500 |
|  | 2.7 | 2,200 |
|  | 8.3 (max.) | 1,500 |
| 3-methylhexamethylene polyoxamide (3Me62) | 0 | 4,200 |
|  | 0.93 | 5,000 |
| 2-methylhexamethylene polyoxamide (2Me62) | 2.24 | 4,200 |
|  | 0 | 3,800 |
| Polyoxamide of 2,11-diaminododecane (DDD-2) | 0 | 3,000 |
|  | 0.9 |  |
|  | 50% R.H. | 2,500 |

TABLE 4

*Toughness properties of certain polyoxamides*

| Property | 66 | 2Me62 | 3Me62 | DDD-2 |
|---|---|---|---|---|
| Tensile strength, p.s.i. (dry) | 10,900 | 11,200 | 9,600 | 10,500 |
| Ultimate elongation, percent (dry) | 50 | 7 | 180 | 12 |
| Izod impact strength, ft. lb./in. (dry) | 1.0 | 0.8 | 1.9 | 0.5 |

TABLE 5

*Rigidity properties*

| Property | 66 | 2Me62 | 3Me62 | DDD-2 |
|---|---|---|---|---|
| Hardness M scale | 40 | 87 | 82 | 83 |
| Deformation (2,000 p.s.i.) 50° C., percent | 1.4 | 0.2-0.9 | 0.5 | 0.4 |
| Stiffness, p.s.i. (dry): |  |  |  |  |
| 25° C | 320,000 | 385,000 | 315,000 | 328,000 |
| 50° C | 225,000 | 335,000 | 270,000 | 275,000 |
| 100° C | 80,000 | 95,000 | 65,000 | 95,000 |

TABLE 6

*Solvent resistance*

I. Water Absorbed at 100% R.H.

| Polymer | Weight Gain, percent |
|---|---|
| 66 | 8.3 |
| 2Me62 | 2.0 |
| 3Me62 | 1.6 |
| DDD-2 | 1.0 |

II. Effect of Boiling in 1.2 N HCl on Molecular Weight

| Polymer | Inherent Viscosity | |
|---|---|---|
|  | Before | After |
| 66 | 1.10 | 0.38 |
| 2Me62 | 1.06 | 1.01 |
| DDD-2 | 0.97 | 0.88 |

EXAMPLE I

One equivalent (147 g.) of purified octamethylene diamine is dissolved in about 1.5 times its weight of dry toluene in a nitrogen-blanketed reactor. Approximately 0.2% of arsenous oxide, based on the diamine, is suspended in the diamine solution by vigorous stirring for 5 minutes. An equivalent (206 g.) of di-n-butyl oxalate is then added rapidly to the reactor, following which the sides of the vessel are washed with 1 lb. of dry toluene. The reaction mixture is stirred vigorously until it sets to a hard white mass (approximately 5 minutes), which is then cooled under nitrogen and dried under vacuum for 6 hours at 145–150° C. The resulting prepolymer has inherent viscosities between 0.1–0.3.

The prepolymer prepared as above is further polymerized in the solid phase by heating at 250–270° C. under dry nitrogen, the ultimate reaction time depending on the desired inherent viscosity in the final polymer. For example, after 6 hours heating, the resulting polymer exhibits an inherent viscosity of 0.74.

In a run similar to the foregoing except that sodium phenyl phosphinate is employed as the polyamidation catalyst, the inherent viscosity of the resulting polymer is 1.32 after treatment for 8 hours in a rotary kiln at the indicated temperature under dry nitrogen.

Polymers prepared in this manner melt at about 280° C., the density being about 1.18, as compared with a density of about 1.14 for poly(hexamethylene adipamide). A sample of poly(octamethylene oxamide) of 0.85 inherent viscosity has a melt viscosity of 311 poises at 295° C.

EXAMPLE II

A sample of polyoctamethylene oxamide (inherent viscosity 1.08) prepared as in Example I is spun into a 420 denier (as-spun) 13 filament yarn. The polymer is melted in a 1-inch horizontal screw melter and is supplied to the spinneret pack at about 300° C. The sand pack comprises graded sand upstream from the spinneret; the layers include (in the order of polymer flow) coarse sand, 60-80 mesh sand, 80-100 mesh sand, 100-150 mesh sand and 150-200 mesh sand, and finally, the spinneret (0.008-inch hole diameter). The filaments are quenched as disclosed in Example I of U.S. Patent No. 2,273,105, with 14° C. air flowing at 40 cubic feet per minute. The freshly-formed filaments are then finished and packaged conventionally. The filaments are drawn 6.7× over a 28-inch hot plate maintained at 230° C. The plate is flat and has a matte chrome finish (0.105 coefficient of surface friction).

The properties obtained with representative yarns of poly(octamethylene oxamide) are compared with the corresponding properties obtained with yarns of poly(hexamethylene adipamide). The results are listed in Table 7.

TABLE 7

| Yarn Properties | Poly (octamethylene oxamide) | Poly (hexamethylene adipamide) |
| --- | --- | --- |
| Crystallinity | (1) | (2) |
| Maximum tenacity/elongation, percent | 8.4/8 | 11/14 |
| Maximum initial modulus | 124 | 68 |
| Denier | 70 | 70 |
| Filaments | 13 | 34 |
| Relaxed cold growth, 1.0 g.p.d., percent | 1.4 | 5.0 |
| Relaxed creep, 1.0 g.p.d., percent | 0.20 | 0.47 |
| Shrinkage, biil-off, percent | 2.5 | 8.0 |
| Recovery Angle, degrees | 250 | 155 |

1 Highly crystalline.
2 Crystalline.

In the above table, the crystallinity of the yarn is determined by conventional X-ray diffraction techniques. The tensile properties are measured in the conventional manner with an Instron Tester. Relaxed cold growth and creep values are determined from the measured elongation of a strand of known length on which a load of 1.0 g.p.d. (grams per denier) has been suspended for 30 minutes. The value of "cold growth" includes not only the instantaneous elongation at the given load but also the elongation which occurs subsequently over the test period, while the "creep" value takes into consideration only the subsequent elongation. Prior to testing the samples are stored in skein form for 48 hours at 55% relative humidity and 25° C., hence the reported values are termed the "relaxed" values. Shrinkage is the percent length change undergone during a 70-minute exposure in boiling water. The recovery angle is determined during the wash-set recovery test and indicates the wash-wear potential of the sample. During the test, a single filament is bent 360° around a wire mandrel, soaked in a 60° C. detergent solution, rinsed, then dried for at least 15 hours under no load. The angle through which the filament recovers is the recovery angle.

A high recovery angle is indicative of good wash-wear performance in fabrics. In this connection, yarns of poly(ethylene terephthalate), which have proven utility as components of wash-wear fabrics, exhibit recovery angles of 210-240.

EXAMPLE III

Analysis of X-ray diffraction patterns and projected unit cell dimensions indicate that the crystalline structure of a sample of the poly(octamethylene oxamide), having an inherent viscosity of 1.08, differs appreciably from that of a similar sample of poly(hexamethylene adipamide). This structure may be described as a "pseudo-crosslinked structure," indicating that it may be highly amenable to further improvement through chemical cross-linking. The results of a typical test are shown in Table 8.

TABLE 8

*Unit cell dimensions of 8–2 and 6–6 nylon compared (DCV)*

| 8-2 | 6-6 (form)[1] |
| --- | --- |
| a=5.23 A<br>b=11.4<br>c=14.7<br>α=46°3'<br>β=65°31'<br>γ=55°33' | a=4.9 A<br>b=5.4<br>c=17.2<br>α=48.5°<br>β=77°<br>γ=63.5° |
| No. of chains passing through unit cell ||
| 2 | 1 |
| Crystal density ||
| 1.234 | 1.24 |
| Projected cell base ||
| a'=4.86<br>b'=8.24<br>γ'=64°54' | a'=4.77<br>b'=4.03<br>γ'=66°15' |

[1] Bunn, C. W., and Garner, E. V., Proc. Roy Soc. (London) A189 39 1947).

( The unit cell dimensions, expressed in Angstrom units, are calculated by reciprocal lattice methods as discussed in the book, Chemical Crystallography, C. W. Bunn, pp. 144–158, Oxford at the Clarendon Press (1952). Interpretation of this data as well as its calculation from fundamental X-ray diffraction data is also explained therein.

The dynamic modulus, discussed in detail in Die Physik de Hochpolymerere, H. A. Stuart, volume 4B, pages 48–97, Springer Verlaek, West Germany (1956), of a typical poly(octamethylene oxamide) yarn (drawn 6.6×), measured at room temperature, 55% relative humidity and 1.2% deformation, shows substantially no change over the frequency range of from 0.01 to 10 cycles per second. The structure is, therefore, substantially linearly elastic from infinitesimal deformations out to relatively large extensions. Furthermore, no mechanical loss is observed either under the test conditions or under dry nitrogen. The dynamic modulus is, therefore, independent of relative humidity over the range of 0 to 55% relative humidity. The yarn also is relatively insensitive to temperature, showing a smooth decrease of dynamic modulus with increasing temperature, over the range of 25 to 180° C. Over this range, no mechanical loss is observed nor is a transition temperature evident. The poly(octamethylene oxamide) structure is capable of substantially complete recovery from deformations imposed at elevated temperature. The combination of high modulus, linear elastic behavior, immediate and complete elastic recovery, and relative insensity to temperature and humidity changes are unique among aliphatic polyamides.

EXAMPLE IV 0.12 gram of sodium phenylphosphinate, 85.02 grams of 2-methyl hexamethylenediamine and about 100 milliliters of toluene are placed under a nitrogen atmosphere in a stainless steel vessel and stirred for about 20 minutes. Di-n-butyl oxalate in an amount of 132.04 grams is then added together with about 40 milliliters of toluene. Fast stirring is maintained throughout the prepolymerization. Toluene is removed at the end of the prepolymerization by applying a vacuum. This prepolymerized batch is placed in a vacuum drying oven at a pressure below 50 millimeters of mercury and the temperature is raised to 80° C. The batch is then transferred to a rotary kiln and the temperature is maintained between 250° C. and 255° C. for 230 minutes to complete the polymerization. The polymer has an inherent viscosity of 0.85. This poly(2- methyl hexamethylene oxamide) power is compacted into pellets, then melted in a screw melter maintained at 293° C., and spun into a 344 total denier, 13 filament undrawn yarn at 400 yards per minute. The drawn yarn (draw ratio of 5.55) has a tenacity of 6.53 g.p.d., elongation of 9.0%, 2.22% growth at 1 g.p.d., and initial modulus of 59.2. This yarn shows superior light and heat durability and better resistance to heat yellowing than does yarn from 66 nylon.

Poly(octamethylene oxamide) also is a versatile modifier which, when added to a polyamide substrate, even in relatively minor amounts, gives rise to a polyamide mixture from which highly useful shaped articles can be prepared. Preferred polyamide substrates include poly(hexamethylene adipamide), poly(caproamide), poly(p-xylylene azelamide), poly(hexamethylene sebacamide) and similar polyamides such as those disclosed in U.S. Patents 2,071,250, 2,071,253 and 2,130,948 to Carothers and 2,625,536 to Kirby, including copolymers thereof. Suitable polymerizable comonomers are also disclosed in these patents.

The present invention also comprehends those "block" and random copolymers of poly(octamethylene oxamide) which contain up to about 10% by weight of copolymerizable monomers not derived from octamethylene diamine or oxalic acid without substantially affecting the desirable properties of the base polymer.

The novel polyamides of this invention may also contain such conventional additives as delusterants, antioxidants, colorants, and the like, which should be incorporated in the known manner and amounts so as not to affect adversely the properties of the base polymer. Generally, these additives constitute no more than about 2% of the total polymer weight.

The outstanding properties of the polymer of this invention, as reflected in yarn properties, including high initial modulus, low cold growth and relaxed creep, high wash-set recovery angle, little or no mechanical loss over an appreciable range of temperature and relative humidity, and no transition temperature up to about 235° C., combine to make this material highly useful in industrial and wash-wear applications. Enhanced utility in conventional applications is also achieved.

Furthermore, the novel polyamides of this invention have a unique physical structure unknown heretofore in aliphatic polyamides. The relatively low melt viscosity readily permits preparation of shaped articles from the melt. The polymer-forming reactants are obtained in a straight-forward manner, the conversion to useful polymers is controllable and practical. Other advantages inherent in the practice of this invention will occur to those undertaking its practice.

From the foregoing description, it is apparent that the polyoxamides defined by the following claims exhibit useful properties which have long been sought in resins of the linear polyamide type.

We claim:
1. A linear, synthetic polycarbonamide wherein the recurring carbonamide units are an integral part of the polymer chain and characterized by a temperature range of workability in the melt of at least about 15° C., the said polycarbonamide consisting essentially of at least 90% by weight based on the said polycarbonamide of repeating units of the formula

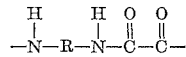

wherein —R— is a member of the class consisting of
—(CH$_2$)$_8$—, —CH$_2$—CH(CH$_3$)—(CH$_2$)$_4$,
—(CH$_2$)$_2$—CH(CH$_3$)—(CH$_2$)$_3$—, and
—CH(CH$_3$)(CH$_2$)$_8$(CH$_3$)CH—, the number of repeating units being sufficiently high to provide a polymer of fiber-forming molecular weight having an inherent viscosity at 25° C., determined upon a solution containing 0.5 gram sample of polymer in m-cresol diluted to 100 cc., of at least about 0.7, copolycarbonamide units when present being formed from a diaminoalkane.

2. The polycarbonamide of claim 1 wherein —R— is —(CH$_2$)$_8$—.
3. The polycarbonamide of claim 1 wherein —R— is —CH$_2$—CH(CH$_3$)—(CH$_2$)$_4$—.
4. The polycarbonamide of claim 1 wherein —R— is —(CH$_2$)$_2$—CH(CH$_3$)—(CH$_2$)$_3$—.
5. The polycarbonamide of claim 1 wherein —R— is —CH(CH$_3$)(CH$_2$)$_8$(CH$_3$)CH—.

References Cited by the Examiner

UNITED STATES PATENTS

| | | | |
|---|---|---|---|
| 2,163,636 | 6/1939 | Spanagel | 260—78 |
| 2,190,770 | 2/1940 | Carothers | 260—78 |
| 2,252,554 | 8/1941 | Carothers | 260—78 |
| 2,558,031 | 6/1951 | Allen | 260—78 |
| 2,977,339 | 3/1961 | Lindegren | 260—78 |
| 2,977,340 | 3/1961 | Bruck | 260—78 |

FOREIGN PATENTS 66,435    3/1948    Denmark.

OTHER REFERENCES

Beilstein: Band 4, System No. 344, pp. 269–270, QD 251 B4, 1918, Journal of Polymer Science, vol. III (1948), pp. 609–619.

WILLIAM H. SHORT, *Primary Examiner.*